UNITED STATES PATENT OFFICE.

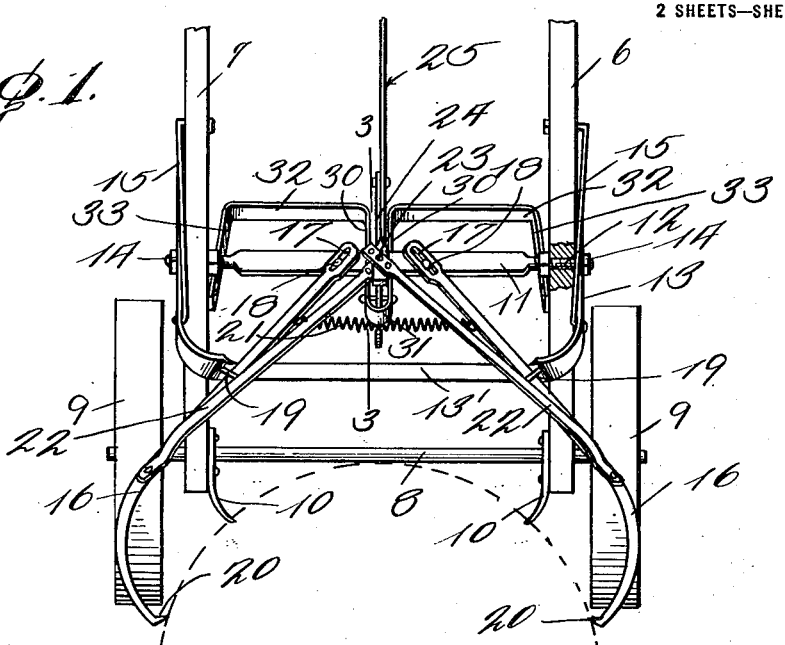
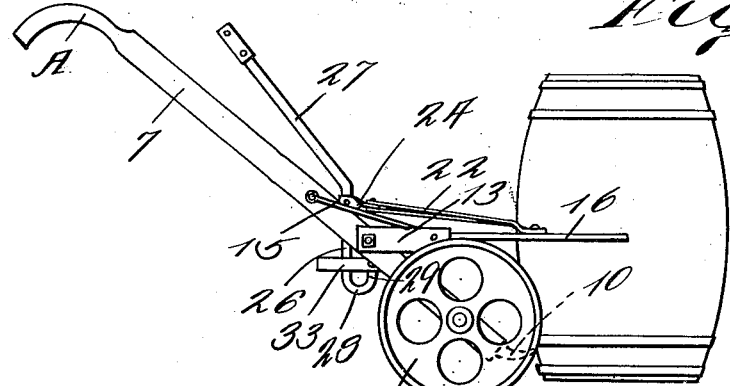
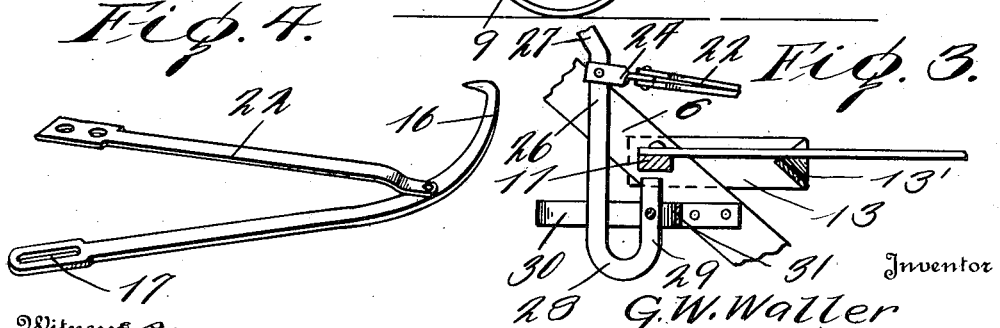

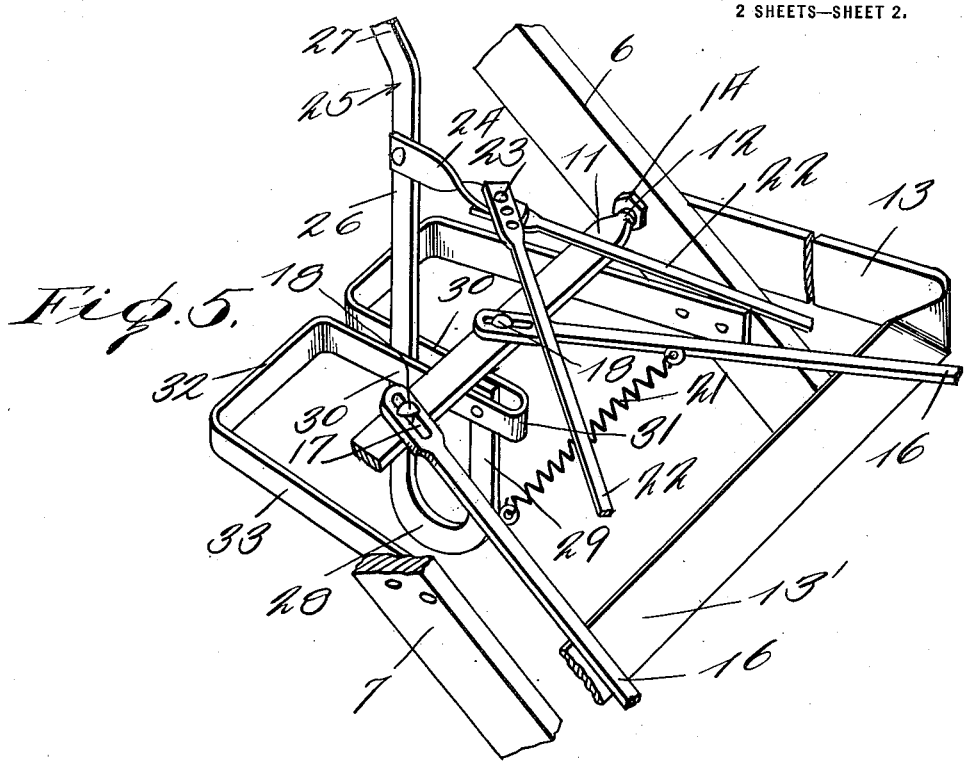
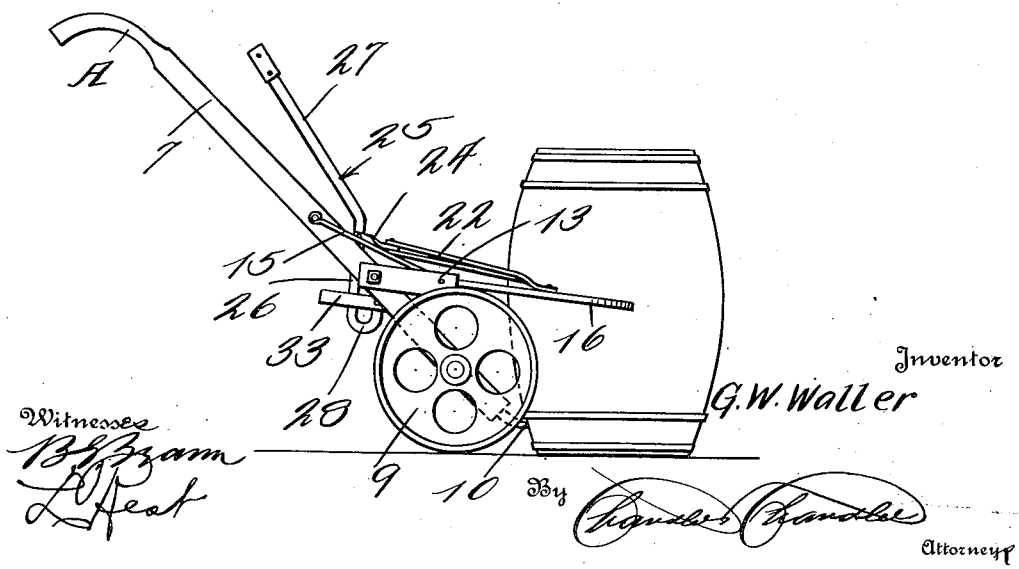

GEORGE W. WALLER, OF HASTINGS, FLORIDA.

BARREL-TRUCK.

1,255,070.   Specification of Letters Patent.   Patented Jan. 29, 1918.

Application filed January 17, 1917. Serial No. 142,866.

*To all whom it may concern:*

Be it known that I, GEORGE W. WALLER, a citizen of the United States, residing at Hastings, in the county of St. Johns, State of Florida, have invented certain new and useful Improvements in Barrel-Trucks; and I do hereby declare the following to be a full, clear, and exact description of the invention, such as will enable others skilled in the art to which it appertains to make and use the same.

This invention relates to trucks and more particularly to barrel trucks and has for its object to provide a truck which, when brought into engagement with a barrel will operate automatically to grip the barrel and will hold the barrel in vertical position while it is transported upon the truck.

Another object is to provide a truck which may be operated to quickly release a barrel engaged therewith.

Other objects and advantages will be understood from the following description.

In the drawings:

Figure 1 is a front elevation illustrating the operating parts of the present invention in the position which they assume when the device is engaged with a barrel.

Fig. 2 is a side elevation of the device, a barrel being illustrated as engaged thereby.

Fig. 3 is a detailed section on line 3—3 of Fig. 1.

Fig. 4 is a detailed perspective of one of the gripping arms and its connected spreader arm.

Fig. 5 is a detailed perspective view considerably enlarged showing the operating parts of the mechanism.

Fig. 6 is a side elevation showing the truck in its initial position when engaging a barrel.

Referring now to the drawings there is shown a truck which includes the usual side members 6 and 7 having a transverse axle 8 at their forward ends, this axle carrying wheels 9 at its ends. Secured to the forward ends of the side members there are two barrel engaging fingers 10 which project beyond the ends of the side members and are curved both upwardly and inwardly and are provided with sharpened extremities.

Rearwardly of the axle, between the side members 6 and 7 there is a transverse plate 11 terminating at its ends in rods 12 which are engaged through the side members. Engaged with the outer ends of the rods there is a U-shaped member 13 which has its bight directed forwardly as indicated at 13'. Nuts 14 hold the legs of the U-shaped member upon the rods 12 and suitable brace rods 15 are connected with the U-shaped member 13 and with the members 6 and 7. A pair of gripping arms 16 are provided, each of these arms having an elongated eye 17 at one end engaged with a headed pin 18, one for each eye, carried by the plate 11. The arms 16 extend forwardly in divergent relation and rest upon the portion 13' of the member 13, where they are engaged within elongated keepers 19 carried by the member 13. These arms 16 have their forward ends curved inwardly and provided with inwardly and rearwardly directed hook points 20. As will be seen, the arms 16 may be moved to shift their forward ends toward and away from each other, such movement being limited by the keepers 19. A helical spring 21 is connected at its ends to the arms to hold them yieldably against separation.

Pivoted to each arm 16 adjacent to its forward end there is a spreader rod 22, these rods extending rearwardly in convergent relation where they are connected at their rearward ends in overlapped relation upon a vertical pivot bolt 23. This bolt is engaged through a link 24 which, at its rearward end, is pivoted to an operating lever 25.

The lever 25 includes a central portion 26 to which the link 24 is pivoted. This central portion is normally vertical, and thereabove the lever is turned rearwardly as indicated at 27 to extend in the general direction of the rearward end of the truck. Below the portion 26 of the lever the latter is turned first forwardly as indicated at 28 and then upwardly as indicated at 29 to form what may be known as a gooseneck. The upper extremity of the portion 29 is pivoted between the arms 30 of a special guide bracket. The arms 30 of this bracket are connected at their forward ends by a bight 31 and at their rearward ends they are turned laterally as indicated at 32 and then forwardly as indicated at 33 to be attached at their extremities to the members 6 and 7. The arms 30 of the bracket thus lie centrally between the members 6 and 7 and extend both forwardly and rearwardly thereof. By reason of the peculiar construction of the lever and its pivotal connection with these arms 30 a longer throw of the lever is obtained.

In use the truck is grasped by the handles A and is moved to bring the side members 6 and 7 into approximately vertical position. The truck is then brought into engagement with a barrel. The forward extremities of the arms 16 will engage the barrel and will be spread thereby so that further movement of the truck will bring the arms at opposite sides of the barrel. At the same time the fingers 10 will have their sharpened extremities brought into engagement with the base of the barrel. If the handles be then moved downwardly to bring the truck into its normal position of use the barrel will be raised from the floor and the hook points 20 of the arms 16 will firmly grip the barrel so that the latter may be shifted from place to place through movement of the truck upon its wheels, the barrel remaining always in vertical position as shown in Fig. 2.

When it is desired to release the barrel the truck is tilted to its initial position thus bringing the bottom of the barrel upon the floor or ground. The lever portion 27 is then forced forwardly, when the rods 22 will spread the arms 16 against the action of the spring 21 to permit the truck to be drawn away from the barrel.

What is claimed is:

1. A barrel truck comprising a frame, a forwardly extending supporting member carried by the frame, a transverse member mounted in the frame, forwardly extending divergent members pivoted at their rearward ends to the transverse member and resting upon the supporting member, said divergent members having barrel engaging hooks at their free ends, means for holding the divergent members yieldably against movement away from each other, a lever pivotally mounted in the frame, spreader rods connected with the lever and with the divergent members for movement of the said members away from each other when the lever is moved in one direction, and barrel engaging points carried by the frame below the divergent members.

2. A barrel truck comprising a frame, a forwardly extending support carried by the frame, arms pivotally connected at their rearward ends with the frame and extending forwardly in divergent relation and resting upon the supporting member, said arms being arranged to grip a barrel at their forward ends, a lever mounted for movement in a plane between the arms, rods connected with the lever and with the arms, for movement of the arms upon their pivots away from each other when the lever is moved in one direction, means for holding the arms yieldably against such movement and barrel engaging points carried by the frame below the arms.

3. A barrel truck comprising a frame including side members, a plate disposed transversely between the side members and having ends engaged therethrough, a supporting member having portions secured upon the ends of the plate outwardly of the side members and including also a portion extending transversely of the frame forwardly thereof, barrel gripping arms disposed to rest upon the transverse portion of the supporting member, said gripping arms being pivoted at their rearward ends to the plate for movement of their forward ends toward and away from each other, a bracket secured to the side members of the frame and extending therebetween, a lever pivotally mounted in the bracket for forward and rearward movement, spreader rods pivoted to the barrel engaging arms and pivotally connected with the lever for movement to separate the gripping arms when the lever is moved in one direction, and barrel engaging points carried by the frame.

In testimony whereof, I affix my signature, in the presence of two witnesses.

GEORGE W. WALLER.

Witnesses:
J. W. CASE,
A. J. MALTBY.